(12) United States Patent
Jacob

(10) Patent No.: US 10,506,411 B1
(45) Date of Patent: *Dec. 10, 2019

(54) PORTABLE HOME AND HOTEL SECURITY SYSTEM

(71) Applicant: STATE FARM MUTUAL AUTOMOBILE INSURANCE COMPANY, Bloomington, IL (US)

(72) Inventor: Michael Shawn Jacob, Le Roy, IL (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/839,010

(22) Filed: Dec. 12, 2017

Related U.S. Application Data

(63) Continuation of application No. 14/940,342, filed on Nov. 13, 2015, now Pat. No. 9,888,371.

(51) Int. Cl.
| | |
|---|---|
| *H04M 11/04* | (2006.01) |
| *H04W 4/90* | (2018.01) |
| *H04M 3/51* | (2006.01) |
| *G08B 13/22* | (2006.01) |
| *G08B 17/06* | (2006.01) |
| *G08B 21/10* | (2006.01) |
| *H04W 84/18* | (2009.01) |
| *H04W 88/02* | (2009.01) |

(52) U.S. Cl.
CPC .............. *H04W 4/90* (2018.02); *G08B 13/22* (2013.01); *G08B 17/06* (2013.01); *G08B 21/10* (2013.01); *H04M 3/5116* (2013.01); *H04W 84/18* (2013.01); *H04W 88/02* (2013.01)

(58) Field of Classification Search
CPC ... H04W 4/008; H04W 88/02; H04W 84/045; H04L 63/1416; H04L 12/2803
See application file for complete search history.

(56) References Cited

U.S. PATENT DOCUMENTS

| | | | | |
|---|---|---|---|---|
| 2009/0037772 A1* | 2/2009 | Wegerich | ........... | G05B 23/0254 714/26 |
| 2016/0093198 A1* | 3/2016 | Tung | ................... | G08B 25/016 340/539.11 |
| 2016/0343237 A1* | 11/2016 | Herman | ............... | G08B 25/008 |

* cited by examiner

*Primary Examiner* — Khalid W Shaheed
(74) *Attorney, Agent, or Firm* — Marshall, Gerstein & Borun LLP

(57) ABSTRACT

Systems and methods for monitoring a local environment for abnormal conditions (e.g., burglary, intrusion, fire, or flooding) are disclosed. Sensors of a smartphone, tablet computer, or other computing device may be used to obtain sensor data regarding the environment. Such sensor data may relate to sounds, temperatures, lighting, or other conditions within the environment. The observed environmental conditions may be compared against reference levels or patterns to determine abnormal conditions. When abnormal conditions are identified, a response may be determined and implemented, such as alerting a user or contacting an emergency service (e.g., police or fire services). In some circumstances, a training period may be used to determine baseline or threshold levels of normal environmental conditions. Different modes or profiles may be used, which may be associated with different environments (e.g., home, hotel, etc.).

20 Claims, 5 Drawing Sheets

PORTABLE HOME AND HOTEL SECURITY SYSTEM

CROSS-REFERENCE TO RELATED APPLICATIONS

This application is a continuation of U.S. patent application Ser. No. 14/940,342, entitled "Portable Home and Hotel Security System," filed Nov. 13, 2015, which is hereby incorporated herein by reference in its entirety.

TECHNICAL FIELD

The present disclosure generally relates to a system and a method for monitoring a local physical environment for abnormal conditions or threats.

BACKGROUND

In any physical environment, a variety of threats to persons or property may arise. Such threats may include theft, violence, fire, or flooding, among others. To reduce the risk of injury, damage, or loss as a result of such threats, alarm systems are frequently installed within residential or commercial buildings. Such alarm systems typically operate to generate an alert upon the occurrence of a specific event, such as the opening of a window or door. Some alarm systems simply sound a siren or cause lights to flash. Other alarm systems transmit an alert to an alarm monitoring service, where a representative may attempt to verify the alarm or provide an opportunity to terminate a false alarm. Such alarm systems can be complex, requiring significant investment in hardware components and installation costs to install the components within a building. The components typically include a hub or base station that is connected to sensors installed at strategically important locations within the building environment, such as doors, windows, or stairwells. Each sensor is configured to address one particular type of threat. For example, a smoke detector detects an indication of fire within the building, while a door sensor detects whether a door has been opened. Some systems also include back-up batteries to continue monitoring if the building's electric power supply is intentionally or otherwise disconnected.

SUMMARY

The present application discloses a method, system, and computer-readable medium storing instructions for monitoring a local physical environment for threats or other abnormal environmental conditions and for responding to abnormal environmental conditions. The method, system, or instructions may particularly use one or more environmental sensors disposed within a mobile computing device that are configured to provide information regarding the local physical environment in which the mobile computing device is located. In some embodiments, the mobile computing device may be a smartphone or a tablet computer. In further embodiments, the mobile computing device may be communicatively connected to a security system installed within a building, which security system may perform part of the monitoring or response.

The method, system, or instructions may include receiving sensor data regarding the local physical environment from the one or more environmental sensors, determining the occurrence of an abnormal environmental condition based upon the received sensor data, determining a response to the abnormal environmental condition, and causing the determined response to be implemented. The abnormal environmental condition may include one or more of the following: a burglary, an unlawful entry, a home invasion, an intrusion, a fire, a flood, a leak, or a structural failure.

In some embodiments, the response may include one or more alerts. The alerts may include alarms or notifications to the user of the mobile computing device, a monitoring service center, an emergency dispatcher, or others. In further embodiments, the one or more alerts include an emergency alert indicating an emergency situation, in which case the response may include an alarm monitoring service, an emergency response system, an emergency response dispatch center, a public safety answering point, a police department, a fire department, an ambulance service, or a hospital. In yet further embodiments, the one or more alerts may include a notification alert to a user, which may include information regarding the abnormal environmental condition. The notification alert may include an option to allow the user to confirm the occurrence of the abnormal environmental condition, disaffirm the occurrence of the abnormal environmental condition, contact an emergency response center, initiate an alarm, cancel an alarm, or take other actions.

The environmental sensors may include one or more of the following: a microphone, a camera, an accelerometer, a gyroscope, a barometer, or a geolocation unit. In some embodiments, one or more additional sensors may be communicatively connected to the mobile computing device. In such embodiments, the received sensor data may further include data from the one or more additional sensors.

In further embodiments, determining the occurrence of the abnormal environmental condition may further include determining a threshold level based upon the one or more environmental sensors, determining a condition level based upon the received sensor data, and determining that the determined condition level has exceeded the threshold level. The threshold level may further be determined based upon training sensor data previously received from the one or more environmental sensors during a training period, which training period may extending over a past period of multiple days or parts of multiple days. In some embodiments, the threshold level may be adjusted based upon information regarding the local physical environment received by the mobile computing device or additional information received from external sources.

BRIEF DESCRIPTION OF THE DRAWINGS

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

DETAILED DESCRIPTION

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Figure 1:
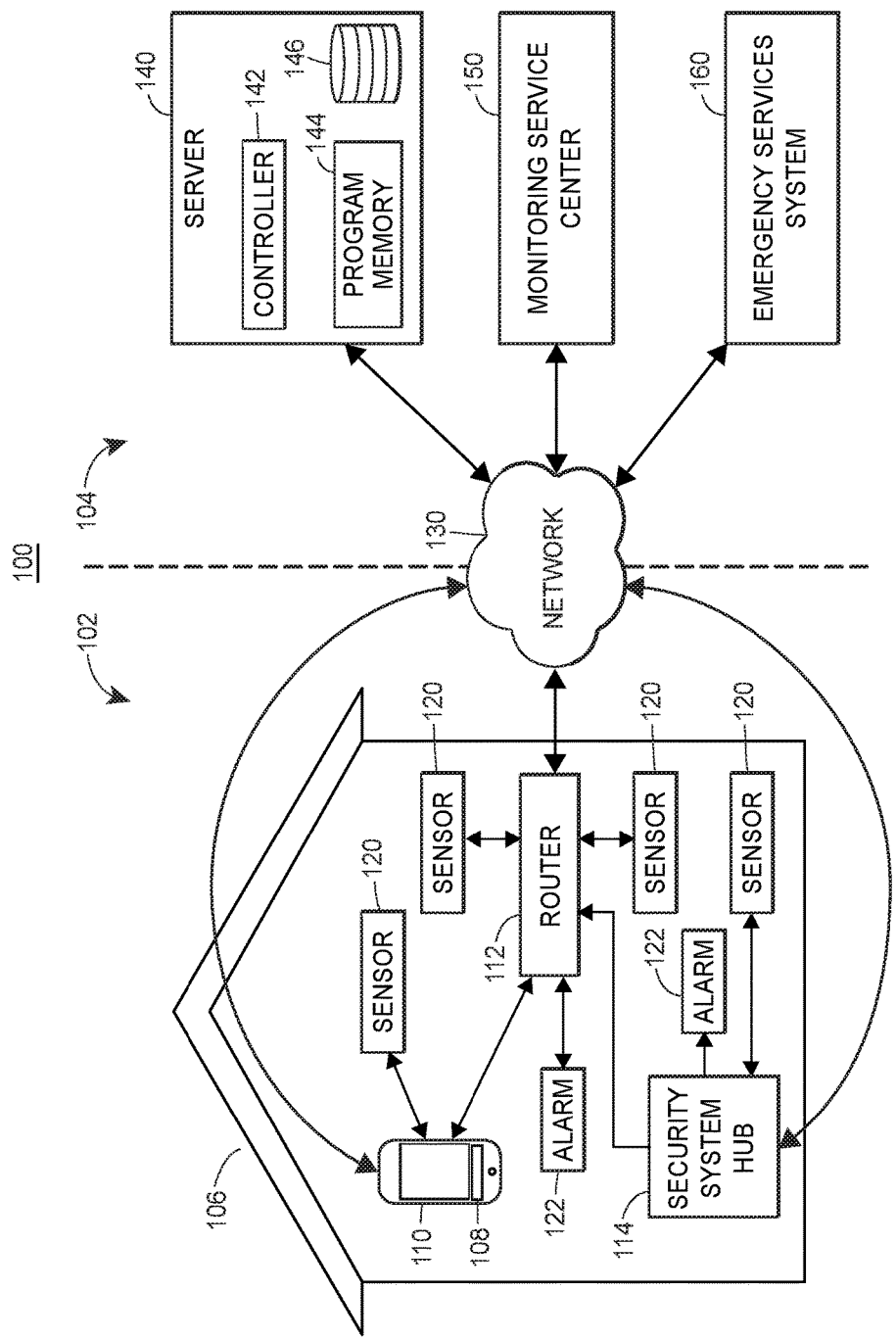
FIG. 1 illustrates a block diagram of an exemplary monitoring system on which the methods described herein may operate in accordance with the embodiments described herein.

FIG. 1 illustrates a block diagram of an exemplary monitoring system 100. The high-level architecture includes both hardware and software applications, as well as various data communications channels for communicating data between the various hardware and software components. The monitoring system 100 may be roughly divided into front-end components 102 and back-end components 104. The front-end components 102 monitor a local physical environment 106 for indications of threats or other abnormal environmental conditions (e.g., fire, burglary, intrusion, etc.) using various sensors. The local physical environment may include a house, apartment, condominium, shop, store, warehouse, storage facility, outbuilding, or other building or structure. The sensors may include internal sensors 108 disposed within a mobile computing device 110 (such as sensors built into a smartphone), as well as external sensors 120 located within the local physical environment 106 and communicatively connected to the mobile computing device 110 or a security system hub 114 (either directly or through a router 112). As used herein, the term "sensors" means one or more internal sensors 108 or one or more external sensors 120, unless the context indicates otherwise. When a threat is determined to exist, the mobile computing device 110 or security system hub 114 may cause an alert to be generated by an alarm 122 (e.g., a siren, light, or speaker) communicatively connected thereto. The front-end components 102 may communicate via a network 130 with the back-end components 104.

The back-end components 104 may support the front-end components 102 in monitoring environmental conditions and responding to identified abnormal environmental conditions. To this end, the back-end components 104 may include a monitoring service center 150 that monitors communications from the front end-components 102 (e.g., a home security monitoring call center) or an emergency services system 160 that provides emergency response services (e.g., a police, fire, or medical services dispatch center). The back-end components 104 may also include a server 140 that records information from the front-end components 104 or provides information regarding known threats or other information relevant to threat determination to the front-end components 102. In some embodiments, the server 140 may process information received from the front-end components 102 to determine the occurrence of abnormal environmental conditions or appropriate responses thereto, and may also communicate with the monitoring service center 150 or emergency services system 160 via the network 130. The server 140 may include a controller 142 to process data and run software programs, applications, or routines stored in a program memory 144, and the server 140 may further include or be communicatively connected to a database 146 for data storage and retrieval.

The front-end components 102 may be arranged in various configurations including varying components depending upon the scope of monitoring desired. The extent and layout of the local physical environment 106 may further be taken into consideration in determining the configuration of the front-end components 102. Although other configurations may be used in various embodiments consistent with the disclosure herein, two types of configurations of the front-end components 102 are particularly discussed. In the first type of configuration, the front-end components 102 include both the mobile computing device 110 having internal sensors 108 and the security system hub 114 communicatively connected to external sensors 120. The mobile computing device 110 may communicate, directly or indirectly through the router 112, with the security system hub 114 to support or enhance the monitoring performed by the security system hub 114. The security system hub 114 may include a control component for a security system installed within a residential or other building, such as the control panel or base station for a home security system. The external sensors 120 may likewise be installed within the local physical environment 106 and connected to the security system hub 114 by wired or wireless communication links. Thus, the first type of configuration may be particularly valuable as an enhancement to a new or existing home security system. In the second type of configuration, the front-end components may include only the mobile computing device 110 with its internal sensors 108 or sensors 120 communicatively connected to it, directly or indirectly through the router 112. This second type of configuration may exclude a separate security system hub 114, instead using the mobile computing device 110 for all of the front-end tasks. Such a configuration may be particularly valuable for use when travelling, such as in hotel rooms or other accommodations.

In various embodiments, the mobile computing device 110 may be any known or later-developed dedicated-use or general-use mobile personal computer, cellular phone, smartphone, tablet computer, or wearable computing device (e.g., a watch, glasses, etc.), having one or more internal sensors 108 disposed within the mobile computing device 110. In a preferred embodiment, the mobile computing device 110 may be a general use smartphone or tablet computer with internal sensors 108. In some embodiments, the mobile computing device 110 may be a thin client device, wherein much or all of the computing processes are performed by the server 140, with information communicated between the thin client mobile computing device 110 and the server 140 via the network 130. The mobile computing device 110 may include any number of internal sensors 108 and may be further communicatively connected to one or more external sensors 120 by any known wired or wireless means (e.g., USB cables, Bluetooth communication, etc.). Because of the energy demands associated with use of the mobile computing device 110 and its associated sensors in monitoring the local physical environment 106, it may be advantageous in some embodiments to restrict or limit monitoring by the mobile computing device 110 to times when the battery of the mobile computing device 110 is charging. For the same reason, in some embodiments, the mobile computing device 110 may be placed within a charging device (not shown), which charging device may include one or more external sensors 120 or may position the mobile computing device 110 to better monitor the local physical environment 106 using the internal sensors 108. In some embodiments, the mobile computing device 110 may be communicatively connected to the alarm 122, which may be disposed within the charging device to provide additional power to the alarm signal. The mobile computing device 110 is further discussed below with respect to FIG. 2.

The security system hub 114 may likewise include any known or later-developed security system control unit or control component that receives data from one or more external sensors 120 and determines whether to generate an alarm or take other responsive action. Such security system hub 114 may be connected to the external sensors 120 by wired or wireless communication links. The security system hub 114 may further be communicatively connected to a router 112, which may provide a communication link to other devices or components in a local network (including the mobile computing device 110, the external sensors 120, or the alarm 122) as well as to other devices or components in an extended network through the network 130 (including the server 140, the monitoring service center 150, or the emergency services system 160). The router 112 may be any wired, wireless, or combination wired/wireless router using any known or here-after developed communication protocol for general- or special-purpose computer communication. In some embodiments, the security system hub 114 may be installed within the local physical environment 106. The security system hub 114 may further include one or more processors to determine whether to generate an alert based upon the sensor data received from the external sensors 120. Upon determining that an alert should be generated, the security system hub 114 may further cause the alarm 122 to present an alert by means of sound, light, or other actions. The security system hub 114 may further be configured to transmit an alert via the network 130 to the monitoring service center 150 or emergency services system 160 in some embodiments.

The sensors may include any sensor devices ordinarily used in security systems or threat detection, as well as any other sensor devices that may be appropriate to detection of changes in environmental conditions that may indicate a threat or abnormal environmental condition. Such sensors may include window or door sensors, motion sensors, photosensors, photo-electric beam sensors, cameras, glassbreak sensors, microphones, water sensors, humidity sensors, temperature sensors, smoke detectors, carbon monoxide or other gas detectors, panic buttons or other manual alert triggers, vibration sensors, barometers, or other sensors that measure or detect the occurrence or level of any physical condition within an environment. The external sensors 120 may be communicatively connected to the mobile computing device 110 or the security system hub 114, either directly or indirectly (such as through the router 112). Such connections may be wired or wireless. Wireless communication may occur by any known means, including ZigBee®, Z-Wave®, as well as Bluetooth, Wi-Fi, or other appropriate wireless communications protocols. The internal sensors 108 of the mobile computing device 110 may include sensors specifically appropriate to mobile devices, as well as any other type of sensor noted elsewhere herein or otherwise appropriate to sensing environmental conditions. For example, the internal sensors 108 may include accelerometers, gyroscopes, geospatial location units, force or pressure sensors, electroencephalograph (EEG) or galvanic skin response (GSR) sensor, biometric sensors (e.g., heart rate sensor, respiratory rate sensor, etc.), or other sensors.

In some embodiments, the front-end components 102 communicate with the back-end components 104 via the network 130. The network 130 may be a proprietary network, a secure public internet, a virtual private network or some other type of network, such as dedicated access lines, plain ordinary telephone lines, satellite links, cellular data networks, combinations of these, etc. Where the network 130 comprises the Internet, data communications may take place over the network 130 via an Internet communication protocol.

The back-end components 104 include one or more servers 140, one or more monitoring service centers 150, or one or more emergency services systems 160. Each server 140 may include one or more computer processors within the controller 142 adapted and configured to execute various software applications and routines of the monitoring system 100 stored in the program memory 144, in addition to other software applications. The controller 142 may include one or more processors (not shown), a random-access memory (RAM) (not shown), the program memory 144, and an input/output (I/O) circuit (not shown), all of which may be interconnected via an address/data bus. The RAM and program memory 144 may be implemented as semiconductor memories, magnetically readable memories, optically readable memories, or any other type of memory known or hereafter developed. The server 140 may further include a database 146, which may be adapted to store data related to the local physical environment 106, such as sensor data or profile data. Such data might include, for example, data regarding ordinary sounds not indicative of an abnormal environmental condition that have been received at a microphone and uploaded to the server 140 via the network 103, such as clock chimes or a passing ambulance. The server 140 may access data stored in the database 146 when executing various functions and tasks associated with the monitoring system 100.

In some embodiments, the server 140 may further communicate with the monitoring service center 150 or the emergency services system 160 via the network 130. Such communication may transmit alerts, as well as other relevant information. The monitoring service center 150 may include an alarm monitoring service, which may utilize a number of servers similar to the server 140. In some embodiments, personnel may review information from the front-end components 102 potential indicating abnormal environmental conditions and may contact the emergency services system 160 or a user of the mobile computing device 110 or the security system hub 114, as appropriate, when potentially threats are identified. The emergency services system 160 may provide emergency response services to address the identified potential threat or abnormal environmental condition. In some embodiments, the emergency services system 160 may include an emergency response dispatch center, a public safety answering point, a police department, a fire department, an ambulance service, or a hospital.

Figure 2:
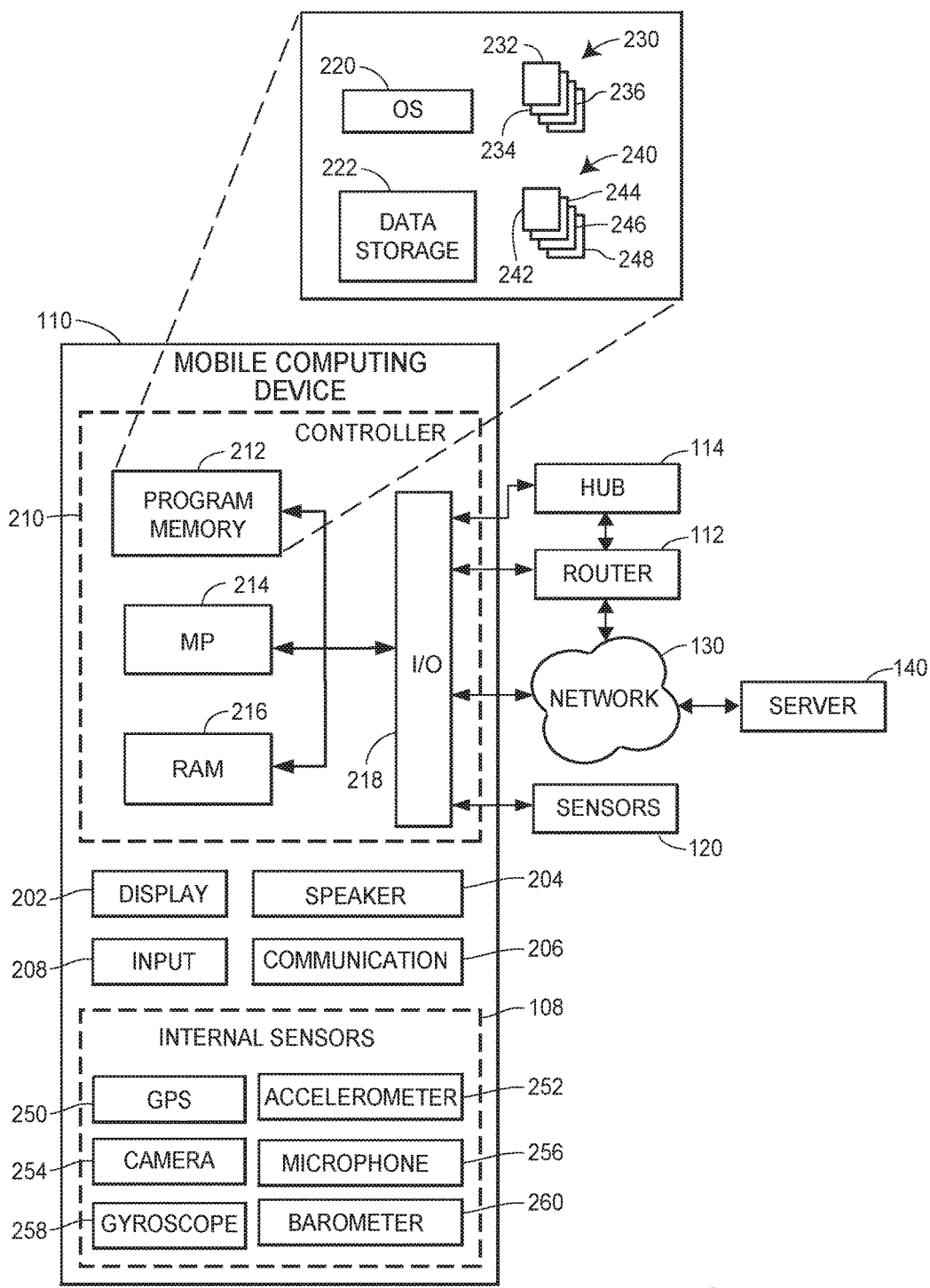
FIG. 2 illustrates a block diagram of an exemplary mobile computing device in accordance with the embodiments described herein.

FIG. 2 illustrates a block diagram of an exemplary mobile computing device 110 in accordance with the monitoring system 100. Such mobile computing device 110 may be a smartphone, a tablet computer, or similar mobile device capable of receiving and processing electronic information. As noted above, the mobile computing device 110 may include one or more internal sensors 108, which may provide sensor data regarding the local physical environment 106. Additionally, the mobile computing device may receive sensor data from one or more external sensors 120, either directly or through the router 112. The sensor data may be processed by the controller 210 to determine whether an abnormal environmental condition exists. Additionally, or alternatively, the sensor data may be sent to one or more processors of the security system hub 114 or server 140 through the network 130 for processing. When the controller 210 (or other processor) determines the occurrence of an abnormal environmental condition, appropriate responses are determined and implemented. Such responses may include causing an alert to be presented using a display 202 or a speaker 206 of the mobile computing device 110. In some embodiments, additional components (not shown) may be utilized to present an alert (e.g., the one or more alarms 122). In some embodiments, the mobile computing device 110 may further include a communication unit 206 to send or receive information from local or distant devices, either directly or through the network 130. Further embodiments of the mobile computing device 110 may include one or more inputs 208 to receive instructions, selections, or other information from a user of the mobile computing device 110.

The mobile computing device 110 may include various input and output components, units, or devices. The display 202 and speaker 206, along with other integrated or communicatively connected output devices (not shown), may be used to present information to the user of the mobile computing device 110 or others. The display 202 may include any known or hereafter developed visual or tactile display technology, including LCD, OLED, AMOLED, projection displays, refreshable braille displays, haptic displays, or other types of displays. The one or more speakers 206 may similarly include any controllable audible output device or component, which may include a haptic component or device. In some embodiments, communicatively connected speakers 206 may be used (e.g., headphones, Bluetooth headsets, docking stations with additional speakers, etc.). The input 208 may further receive information from the user. Such input 208 may include a physical or virtual keyboard, a microphone, virtual or physical buttons or dials, or other means of receiving information. In some embodiments, the display 202 may include a touch screen or otherwise be configured to receive input from a user, in which case the display 202 and the input 208 may be combined.

The mobile computing device 110 may further include internal sensors 108. In some embodiments, additional external sensors 120 may be communicatively connected to the mobile computing device, either directly or through the network 130. The internal sensors 108 or the external sensors 120 may include any devices or components mentioned herein, other extant devices suitable for monitoring a physical environment (including biometric sensors or other sensors configured to provide information regarding the state or actions of a person within the environment), or later-developed devices that may be configured to provide data regarding a physical environment (including persons within the physical environment). The sensors of the mobile computing device 110 may further include additional internal sensors 108 or external sensors 120 configured or intended for other uses, such as geolocation, movement tracking, photography, or spatial orientation of the device. Such additional sensors may, nonetheless, be used to provide sensor data for monitoring the local physical environment 106, as discussed herein.

Although discussion of all possible sensors of the mobile computing device 110 would be impractical, if not impossible, several sensors warrant particular discussion. Disposed within the mobile computing device 110, the internal sensors 108 may include a GPS unit 250, an accelerometer 252, a camera 254, a microphone 256, a gyroscope 258, or a barometer 260. Any or all of these may be used to generate sensor data for monitoring or training purposes. Additionally, other types of currently available or later-developed sensors may be included in some embodiments.

The GPS unit 250, the accelerometer 252, and the gyroscope 258 may provide information regarding the location or movement of the mobile computing device 110. The GPS unit 250 may use "Assisted GPS" (A-GPS), satellite GPS, or any other suitable global positioning protocol (e.g., the GLONASS system operated by the Russian government) or system that locates the position of the mobile computing device 110. For example, A-GPS utilizes terrestrial cell phone towers or Wi-Fi hotspots (e.g., wireless router points) to more accurately and more quickly determine location of the mobile computing device 110, while satellite GPS generally is more useful in more remote regions that lack cell towers or Wi-Fi hotspots. The accelerometer 252 may include one or more accelerometers positioned to determine the force and direction of movements of the mobile computing device 110. In some embodiments, the accelerometer 252 may include a separate X-axis accelerometer, Y-axis accelerometer, and Z-axis accelerometer to measure the force and direction of movement in each dimension respectively. It will be appreciated by those of ordinary skill in the art that a three dimensional vector describing a movement of the mobile computing device 110 through three dimensional space can be established by combining the outputs of the X-axis, Y-axis, and Z-axis accelerometers using known methods. Similarly, the gyroscope 258 may be used in addition to, or instead of, the accelerometer 252 to determine movement of the mobile computing device 110. For example, a MEMS gyroscope may be included within the mobile computing device 110 to detect movement of the mobile computing device 110 in three dimensional space. Of course, it should be understood that other types of gyroscopes 258 or other types of movement-detecting sensors may be used in various embodiments. In some embodiments, one or more accelerometers 252 or gyroscopes 258 may be disposed within a wearable device associated with a user, such that the sensor data therefrom may indicate movement of the user. Such sensor data may further be used to determine whether the user is moving about the environment, is stationary (e.g., sleeping), or has suddenly started moving.

The camera 254 may be used to detect light levels, as well as objects or visual patterns that may be indicative of conditions with the local physical environment 106. It will be readily understood that one or more cameras 254 may be disposed within the mobile computing device 110 and configured to generate either still images or video recordings. It will further be understood that many smartphones or tablet computers include front and back solid state digital cameras, which may be used to simultaneously obtain images of a large portion of the area before and behind the phone or tablet. Additional cameras 254 may also be communicatively connected to the mobile computing device 110, including webcams or dashcams. Such cameras 254 may, for example, be used to detect unexpected changes in light levels or identify suspicious lights sources (e.g., a flashlight or flame). In some embodiments, the camera 254 may include a flash or lighting device to illuminate the subject area. Such device may be used in accordance with the methods and systems described herein to illuminate an area for further monitoring, to illuminate a suspicious condition to be recorded in case of loss or damage, or to present a visual warning or alert. Further, the camera 254 may include an infrared illuminator or other device to facilitate low light or night image capturing without illumination of the environment. Such infrared illuminators may be automatically activated when light is insufficient for image capturing.

The microphone 256 may be used to detect sounds within the local physical environment 106. One or more microphones 256 may be disposed within the mobile computing device 110 or may be communicatively connected thereto. For example, special-purpose wired or wireless microphones 256 may be connected to the mobile computing device 110 to provide additional monitoring capacity. The one or more microphones 256 may be used to monitor the environment for sounds indicating suspicious or anomalous conditions, such as glass breaking, wood cracking, drawers hastily opened, water dripping, sudden loud noises, or other sounds that may indicate (individually or in combination) an abnormal environmental condition.

The barometer 260 may likewise be used to detect changes in atmospheric pressure within the local physical environment 106. Such barometers 260 may include MEMS barometers disposed within a smartphone or tablet. Barometric sensor data may be used to determine changes in weather at a location that may increase environmental risks, such as flooding, or may indicate that other sensor data is not abnormal within the environment, such as water dripping during a storm. Barometric sensor data may further be used to determine abrupt changes that may be indicative of an abnormal environmental condition, such as a change in pressure when a window or door is opened.

The mobile computing device 110 may also communicate with the router 112, the security system hub 114, the external sensors 120, the alarm 122, the network 130, the server 140, the monitoring service center 116, or the emergency services system 118. Such communication may involve the communication unit 204, which may manage communication between the controller 210 and external devices (e.g., the router 112, the network 130, etc.). The communication unit 204 may further transmit and receive wired or wireless communications with external devices, using any suitable wireless communication protocol network, such as a wireless telephony network (e.g., GSM, CDMA, LTE, etc.), a Wi-Fi network (802.11 standards), a WiMAX network, a Bluetooth network, etc. Additionally, or alternatively, the communication unit 204 may also be capable of communicating using a near field communication standard (e.g., ISO/IEC 18092, standards provided by the NFC Forum, etc.). Furthermore, the communication unit 204 may provide input signals to the controller 210 via the I/O circuit 218. The communication unit 204 may also transmit sensor data, device status information, control signals, or other output from the controller 210 to one or more of the router 112, the security system hub 114, the external sensors 120, the alarm 122, the network 130, the server 140, the monitoring service center 116, or the emergency services system 118.

The mobile computing device 110 may further include a controller 210. The controller 210 may receive, process, produce, transmit, and store data. The controller 210 may include a program memory 212, one or more microcontrollers or microprocessors (MP) 214, a random access memory (RAM) 216, and an I/O circuit 218. The components of the controller 210 may be interconnected via an address/data bus or other means. It should be appreciated that although FIG. 2 depicts only one microprocessor 214, the controller 210 may include multiple microprocessors 214 in some embodiments. Similarly, the memory of the controller 210 may include multiple RAM 216 and multiple program memories 212. Although the FIG. 2 depicts the I/O circuit 218 as a single block, the I/O circuit 218 may include a number of different I/O circuits, which may be configured for specific I/O operations. The microprocessor 214 may include one or more processors of any known or hereafter developed type, including general-purpose processors or special-purpose processors. Similarly, the controller 210 may implement the RAM 216 and program memories 212 as semiconductor memories, magnetically readable memories, optically readable memories, or any other type of memory.

The program memory 212 may include an operating system 220, a data storage 222, a plurality of software applications 230, and a plurality of software routines 240. The operating system 220, for example, may include one of a plurality of mobile platforms such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage 222 may include data such as user profiles and preferences, application data for the plurality of applications 230, routine data for the plurality of routines 240, and other data necessary to interact with the server 140 through the digital network 130. In some embodiments, the controller 210 may also include, or otherwise be communicatively connected to, other data storage mechanisms (e.g., one or more hard disk drives, optical storage drives, solid state storage devices, etc.) that reside within the mobile computing device 110. Moreover, in thin-client implementations, additional processing and data storage may be provided by the server 140 via the network 130.

The software applications 230 and routines 240 may include computer-readable instructions that cause the processor 214 to implement training, monitoring, and response functions. Thus, the software applications 230 may include a training application 232 to collect sensor data and determine a profile of usual or unusual environmental conditions, a monitoring application 234 to determine whether an abnormal environmental condition has occurred based upon sensor data, and a response application 236 that determines and implements an appropriate response to an abnormal environmental condition. The software routines 240 may support the software applications 230 and may include routines such as a sound processing routine 242 to process sensor data from the microphone 256 to identify sounds, a communication routine 244 for communicating with the security system hub 114, a threat level routine 246 to determine the likelihood of an abnormal environmental condition based upon received sensor data or other information, and an alert routine 248 for generating or implementing an alert or alarm in response to an abnormal environmental condition. It should be understood that additional or alternative applications 230 or routines 240 may be included in the program memory 212, including web browsers or other applications of the sort ordinarily stored on a mobile devices.

In some embodiments, the mobile computing device 110 may include a wearable computing device or may be communicatively connected to a wearable computing device. In such embodiments, part or all of the functions and capabilities of the mobile computing device 110 may be performed by or disposed within the wearable computing device. Additionally, or alternatively, the wearable computing device may supplement or complement the mobile computing device 110. For example, the wearable computing device 110 may be a smart watch with a display 202, a speaker 206 (or haptic alert unit), an input 208, and one or more internal sensors 108. Such smart watch may be communicatively connected to a smartphone and used interchangeably with the smartphone for some purposes (e.g., displaying information, providing user alerts, etc.). The smart watch may also supplement the information available to the smartphone with additional sensor data. In some embodiments, this additional sensor data may be used to determine a user state or the condition of the local physical environment 106. Such additional sensor data may include biometric data, such as heart rate, temperature, galvanic skin response, or other physiological data regarding the state of the user.

The monitoring system 100 described above and illustrated in FIGS. 1-2 may be used to perform the monitoring methods discussed further below. Although the following description of exemplary methods discusses monitoring and other features of the invention disclosed herein as being performed by the mobile computing device 110 for clarity, it should be understood that part or all of the methods could be performed by any combination of the mobile computing device 110, the security system hub 114, the server 140, the monitoring service center 150, or the emergency services system 160, in various embodiments. For example, the mobile computing device 110 may be capable of performing all the steps of the methods herein as a stand-alone device, but it may nonetheless be configured in some embodiments to supplement the monitoring activities of the security system hub 114 when communicatively connected thereto.

Figure 3:
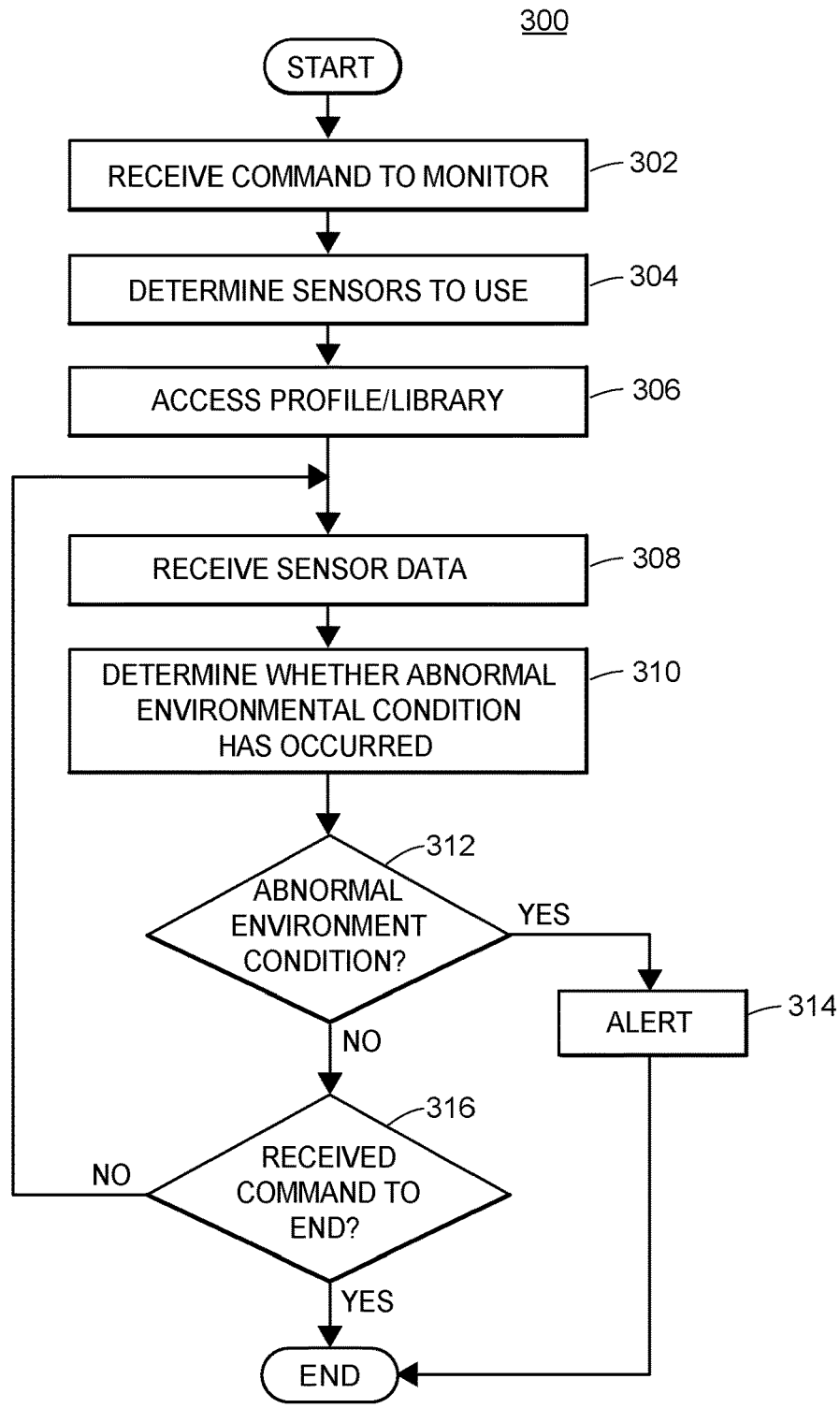
FIG. 3 illustrates a flow diagram of an exemplary monitoring method in accordance with the embodiments described herein.

FIG. 3 illustrates a flow diagram of an exemplary monitoring method 300 for monitoring the local physical environment 106 using the monitoring system 100. The method 300 may begin upon receiving a request or command to monitor the local physical environment 106 at block 302, which may be automatically generated by the mobile computing device 110 in some embodiments. The mobile computing device 110 may also determine at block 304 one or more sensors to use to monitor the local physical environment, which may depend upon availability of sensors or the conditions within the local physical environment 106. The mobile computing device 110 may further access at block 306 a profile or library containing information regarding potential threats or sensor data patterns indicating possible abnormal environmental conditions, which may be locally stored or accessed through the network 130. With this or similar information, the mobile computing device 110 may receive sensor data at block 308 and determine from the sensor data whether an abnormal environmental condition has occurred at block 310. If any an abnormal environment conditions are found at block 312, the mobile computing device 110 may cause one or more alerts to be generated or presented at block 314. If no abnormal environmental conditions are found at block 312, the system 100 may continue to monitor the local physical environment 106 until a command to discontinue monitoring is found to have been received at block 316. The monitoring method 300 may then terminate and, in some embodiments, record information regarding the received sensor data or the implementation of the method 300.

At block 302, the mobile computing device 110 may receive a command to begin monitoring the local physical environment 106. Such command may be generated as a response to user input via the input 208 (e.g., upon user selection of an option to initiate the monitoring process or upon user instantiation of a monitoring application on the mobile computing device 110). In some embodiments, the command may instead be automatically generated, such as upon the occurrence of an event. For example, the mobile computing device 110 may automatically generate a command to begin monitoring when connected to a power source or charging device. In some embodiments, the mobile computing device 110 may constantly monitor the various local environment in which it may be located. In such embodiments, the command may further indicate a level of sensitivity or alertness to potential threats within the environment or may indicate the type of environment (e.g., home, hotel room, office, car, train, etc.). As a further example, the command may be automatically generated based upon a previously received selection of one or more settings from a user. For example, the settings may indicate that the command to begin monitoring should be generated at a specified time, at a specified location, when the mobile computing device 110 is connected to a specified local network, or upon meeting other conditions. As yet further examples, the security system hub 114 may generate a command to begin monitoring when the mobile computing device 110 becomes communicatively connected to it, or the user may cause the security system hub 114 to generate a command to begin monitoring when the user arms the installed security system.

At block 304, the mobile computing device 110 may determine one or more of the internal sensors 108 or the external sensors 120 to use in monitoring the local physical environment 106. This may include determining available sensors or verifying connections to sensors expected to be available. Such verification may allow appropriate adjustments to be made if the operating conditions or efficiency of any of the sensors degrade over time or if expected sensors become disconnected (e.g., if a loose or damaged wire disconnects an external sensor 120 from the security system hub 114, if a power outage shuts down the server 112, etc.). As noted above, it may be beneficial to monitor different environments with different settings or different combinations of sensors. For example, microphones may be less useful in noisy environments, such as during strong storms. Similarly, cameras may be of more use in a hotel room than in a house, where more light from external sources may reach the camera. Other considerations may be used in determining sensors to be used for monitoring, such as the battery level of the mobile computing device 110 or whether the mobile computing device 110 is connected to a power source. Thus, in various embodiments, the mobile computing device 110 may determine one or more sensors to use in monitoring the local physical environment 106 in order to conserve power, to maximize detection of abnormal environmental conditions, to limit false positives, to optimize serious threat detection relative to power consumption, or according to other preferences or objectives (such as those set by the user).

At block 306, the mobile computing device 110 may further access a profile or library containing information relevant to monitoring. Such information may include correlations between sensor data and possible threats or abnormal environmental conditions, as well as patterns of sensor data corresponding to certain occurrences. For example, various patterns of sensor data from microphones or other sensors may be associated with different types of glass breaking, with window glass breaking being highly correlated with an abnormal environmental condition but a drinking glass breaking being less highly correlated with an abnormal environmental condition. In some embodiments, a profile developed during a training period or based upon previous monitoring of an environment may be used to improve the accuracy of the monitoring. For example, the profile may contain information indicating that a dripping faucet is usual in the local physical environment 106, thus avoiding a false positive determination of a water leak. As another example, the profile may contain information indicating that a user typically rises multiple times during the night but also snores loudly, thus allowing the mobile computing device 110 to distinguish between instances when there is movement without snoring (suggesting the user is the cause of the movement) and when there is movement with snoring (suggesting the user is still asleep). In some embodiments, the profile or library may include information specific to a type or configuration of sensors or other front-end components 102. In further embodiments, the appropriate profile or library may be accessed based upon location data from the mobile computing device 110, such as from the GPS unit 150. Additionally, the profile or library may be accessed from local program memory 212 of the mobile computing device 110 or may be accessed from the database 146 of the server 140 via the network 130.

At block 308, the sensors may generate sensor data, which may be received by the controller 210 of the mobile computing device 110. The sensor data may be received directly from the internal sensors 108 or external sensors 120 or may be received through a communication link via the communication component 206. The sensor data may include raw sensor data in a continuous stream or preprocessed data, which may be normalized, adjusted, discretized, smoothed, interpreted, formatted, or otherwise manipulated prior to receipt by the controller 210. In some embodiments, the security system hub 114 may receive sensor data from external sensors 120, process at least part of the received sensor data, and transmit a summary of the received sensor data to the mobile computing device 110. In an alternative embodiment, the mobile computing device 110 may transmit sensor data (or a summary of sensor data) from one or more internal sensors 108 or one or more external sensors 120 to the security system hub 114 to facilitate or enhance monitoring of the local physical environment 106 by the security system hub 114.

In some embodiments, the mobile computing device 110 or security system hub 114 may further receive additional information from the mobile computing device 110 or security system hub 114 (e.g., such as by user input) or from external sources via the network 130 to supplement the sensor data. Such additional information may include information regarding weather conditions (e.g., storm warning, flood warnings, or temperature readings or forecasts), statistical data regarding risks of potential threats (e.g., theft, fire, or similar statistics), power outages, civil unrest, local crime reports, or other information relevant to either predicting the likelihood of an abnormal environmental condition occurring or interpreting sensor data (e.g., recognizing fireworks explosions as usual and non-threatening occurrences in the first week of July). In some embodiments, this additional information may be used to adjust profiles or threshold levels for determining the occurrence of abnormal environmental conditions.

At block 310, the mobile computing device 110 may determine whether an abnormal environmental condition has occurred based upon the received sensor data. The abnormal environmental condition may include a burglary, an unlawful entry, a home invasion, an intrusion, a fire, a flood, a leak, or a structural failure. In some embodiments, the determination may further be based upon received additional information, as discussed above. Determining whether an abnormal environmental condition has occurred may include determining whether the sensor data directly indicate an occurrence of an abnormal environmental condition (e.g., a window sensor indicates that a window has been opened or a motion sensor detects motion above a built-in threshold). Alternatively, or additionally, the determination may include determining whether the sensor data from one or more sensors sufficiently match (e.g., 80% match, 95% confidence, etc.) a known pattern associated with an abnormal environmental condition (e.g., a flickering increase in light combined with a steep increase in temperature may be indicative of a fire). As a further alternative or addition, the determination may include determining whether the total risk level from the sensor data exceeds a threshold, which may depend upon the profile or settings selected by a user. In various embodiments, the determination of the occurrence of an abnormal environmental condition may be made by processors of the security system hub 114, the server 140, or the monitoring service center 150 (which may include human review or assessment by a reviewer at the monitoring service center 150).

At block 312, the mobile computing device 110 may check at block 310 whether an abnormal environmental condition has been determined to exist. When no abnormal environmental condition has been determined to have occurred, the method 300 may continue by checking at block 316 whether a command to discontinue or terminate monitoring has been received at the mobile computing device 110. In a manner analogous to that of the command to begin monitoring the local physical environment 106 discussed above with respect to block 302, the command to discontinue monitoring may be received from the user via direct input or selection of an option, or the command to discontinue monitoring may be automatically generated upon the occurrence of an event. For example, the command to discontinue monitoring may automatically be generated upon unplugging the mobile computing device 110 from a charging connection or otherwise removing the mobile computing device from an external power source (e.g., by removing the mobile computing device 110 from proximity to an inductive charging station or device). In some embodiments, the command to discontinue monitoring may include a command to discontinue some types of monitoring or use of some sensors. This may be done to restrict power use or to limit false positive alerts in some situations. When no command to discontinue monitoring has been received, the method 300 may continue by receiving sensor data at block 308 and determining whether an abnormal environmental condition has occurred at block 310, as discussed elsewhere herein. When a command to discontinue monitoring has been received, the method 300 may (fully or partially) end.

In some embodiments, a report or summary may be generated and stored in the program memory 212 or the database 146. Such information may then be used to form or adjust a profile or library to improve future monitoring. Such stored information may likewise include part or all of the sensor data received while monitoring was ongoing, which may be stored for a period of time for use in any investigation if damage or loss should later be determined to have occurred.

When an abnormal environmental condition has been determined to have occurred at block 312, the mobile computing device 110 may cause an alert to be generated or presented at block 314. In some embodiments, a plurality of alerts may be presented, including a warning alert to the user of the mobile computing device 110 for confirmation or cancellation of a general alert. The alert may be presented by the display 202 or the speaker 204 of the mobile computing device 110 or may be presented by the one or more alarms 122 or other devices. In some embodiments, the mobile computing device 100 may use a wearable computing device (e.g., a smart watch or fitness tracker) may be used to alert the user, such as by presentation of a haptic alert. In further embodiments, the alert may provide information regarding the abnormal environmental condition, such as information indicating the type of threat posed by the condition (e.g., fire, intrusion, water damage, gas leak, etc.) or information indicating the relevant sensor data indicating the occurrence of the abnormal environmental condition (e.g., window opened, glass broken, motion detected, smoke detected, etc.). In some embodiments, the mobile computing device 110 may determine an appropriate response to the abnormal environmental condition from among a range of possible responses, including alerts or other types of responses. The responses may include causing an emergency alert to be communicated via the network 130 to one or more of the following: an alarm monitoring service, an emergency response system, an emergency response dispatch center, a public safety answering point, a police department, a fire department, an ambulance service, or a hospital. In further embodiments, an alert may be communicated to the server 140, the monitoring service center 150, or the emergency services system 160 for further review or action. For example, the mobile computing device 110 or security system hub 114 may transmit an alert via the network 130 to the monitoring service center 150 (or a server 140 associated therewith), where the alert may be reviewed by a customer service representative in an attempt to verify the occurrence or nonoccurrence of the abnormal environmental condition. Upon verification of occurrence or failure to reach the user, the customer service representative may further cause an alert to be sent to the emergency services system 160, which may dispatch appropriate emergency services (e.g., police, fire, or ambulance services) to the local physical environment 106. Upon terminating, clearing, or resetting the alert (by action of the user, monitoring service, emergency responder, alert time-out, or otherwise), the method 300 may end.

Figure 4:
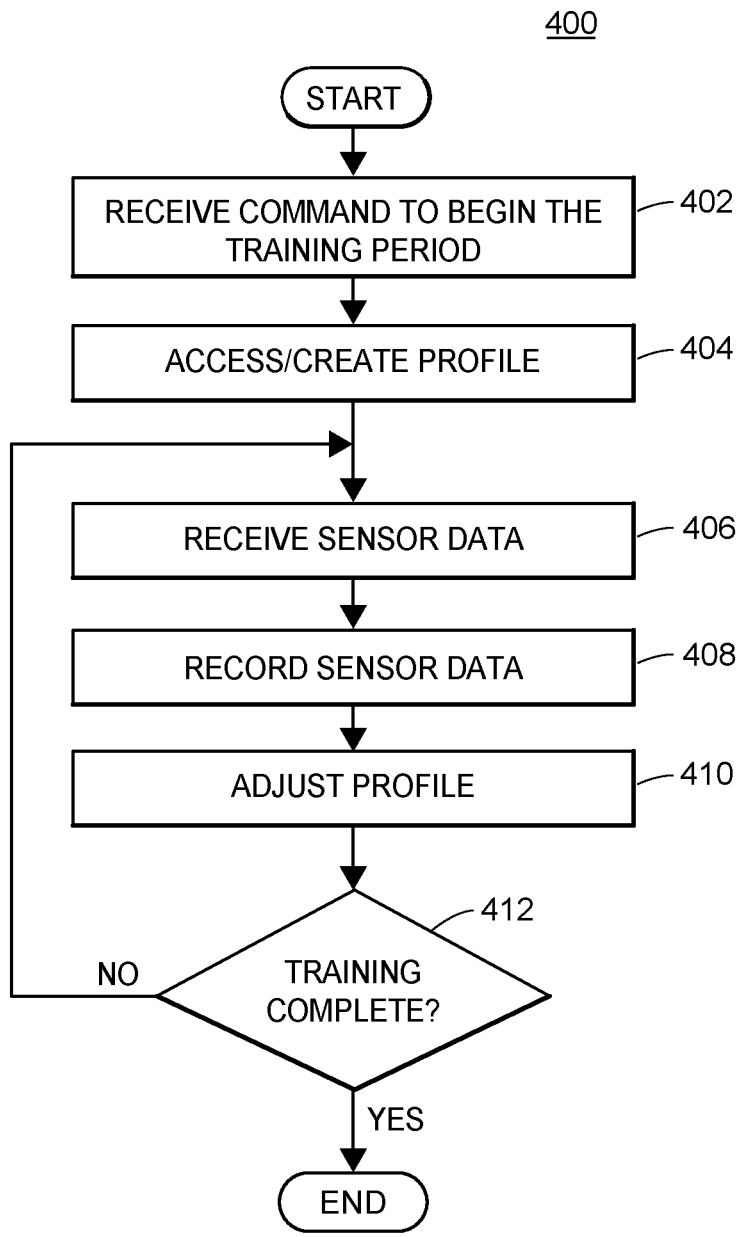
FIG. 4 illustrates a flow diagram of an exemplary training method in accordance with the embodiments described herein.

FIG. 4 illustrates a flow diagram of an exemplary training method 400 for training the monitoring system 100 to respond appropriately to environmental conditions based upon received sensor data. The training method 400 may be implemented during a training period, during which the presentation of some or all of the potential responses may be suppressed. For example, the mobile computing device 100 may cause alarms to be presented only with a warning delay to allow the user time to deactivate the alarm. Alternatively, only clear indications of abnormal environmental conditions (e.g., sensor data from a window or door sensor indicating opening of a window or door while the system is armed) may trigger a response during the training period. The training method 400 may begin at block 402 with the receipt of a command to begin the training period, which may cause the mobile computing device 110 to access or create a profile for the training. In some embodiments, multiple profiles may be created and used for different locations or conditions (e.g., a home profile, a hotel profile, a weekday profile, a weekend profile, or a vacation profile). At blocks 406-412, the mobile computing device 110 may receive and record sensor data, which may be used to build or adjust a profile, until the training period is determined to be completed. In some embodiments, subsequent training periods may be used to adjust or update the system 100 periodically or as necessary to accommodate changes in the local physical environment 106 or the system 100 (e.g., annually, after moving, or after installing a new security system or component).

At block 402, the mobile computing device 110 may receive a command to start the training period. The command may be received from a user by selection of an option to begin training, or the command may be automatically generated upon the occurrence of an event. Such commands may be generated by events such as installation or first use of an application or program on the mobile computing device 110, receipt of a command to begin monitoring in a new geographic location, installation of an upgrade or update of an application or program, identification of a new sensor, communication with a new security system hub 114, passage of a period of time (e.g., one year from a previous training period), or receipt of a request to create a new profile. In some embodiments, the command to start the training period may including information regarding the duration of the training period or the appropriate responses to implemented if an abnormal environmental condition is determined to have occurred during the training period.

At block 404, the mobile computing device 110 may access or create a profile to store information obtained during the training period. In some embodiments, the profile may be stored on or accessed from database 146 of the server 140. In other embodiments, the profile may be stored locally in the data storage 222 of the mobile computing device 110. The profile may include information relevant to monitoring local physical environmental conditions, such as ordinary sounds, movements, lights, temperature, air pressure, or other static or variable conditions that may be specific to an environment. For example, an environment may contain recurring sounds that are not indicative of abnormal conditions but could indicate abnormal conditions in other environments, such as train whistles for a house near a railway or loud chimes of a grandfather clock. Similarly, the profile may include information regarding available sensors, sensor configuration, sensor sensitivity, connections to one or more security system hubs 114, user preferences, or settings. For example, the profile may include a user preference or setting to disable or adjust monitoring when a daily alarm occurs. Other settings may allow the user to select sensors to be used or sensitivity levels to use in determining the occurrence of abnormal environmental conditions. Settings may be either directly adjusted by the user or may be derived from information received from the user. For example, indications of possible abnormal environmental conditions may be presented to the user during the training period for verification. If the user indicates that a particular indication is not related to an abnormal environmental condition (e.g., movement caused by a pet or glass breaking in a recycling bin), settings relating to the use of similar sensor data may be adjusted without direct user direction to adjust such settings.

In some embodiments, the profile may be based upon a generic or base profile (or may include a generic library) that includes information of general applicability. For example, such profile or library may contain example sound patterns of different types of glass breaking or water dripping. Such profile or library may further include general probability or risk levels associated with different example data. For example, flat glass panes breaking may be assigned a higher risk level than breaking glass stemware, or distinct drips of water may be assigned a higher risk level than many drips at varying distances (which may be indicative of rain). Such generic or base profile may be refined or adjusted during the training period to improve monitoring a specific environment or for a particular user's preferences or routine.

At block 406, the mobile computing device 110 may receive sensor data from the internal sensors 108 or the external sensors 120, as discussed elsewhere herein. The sensor data may be received directly or indirectly, in raw or modified form. This sensor data may further be supplemented with additional information from the mobile computing device 110 or security system hub 114 or from external sources via the network 130. As noted above, such additional information may include information regarding weather conditions, statistical data regarding risks of potential threats, power outages, civil unrest, local crime reports, or other information relevant to either predicting the likelihood of an abnormal environmental condition occurring or interpreting sensor data.

At block 408, the sensor data (and additional information) may be recorded by the mobile computing device 110. In some embodiments, the security system hub 114, the server 140, or another computer communicatively connected to the mobile computing device 110 (e.g., a personal computer) may be caused to store or process some or all of the received sensor data (or additional information). For example, a personal computer communicatively connected to the mobile computing device 110 via router 112 may include an installed program to receive, record, and process information from the mobile computing device 110 or security system hub 114 during the training period. Such exemplary embodiment may offer more storage, greater processing power, or a better user interface for the user.

At block 410, the mobile computing device 110 may process the recorded sensor data (and additional information, if available) to determine and make adjustments to the profile. Such adjustments may include changes to alert thresholds, correlations between sensor data patterns and threats, or weights associated with different types of sensor data. In some embodiments, adjustments to the profile may be determined using one or more processors of the server 140, which may run specialized algorithms or software to determine the adjustments. In some embodiments, the server 140 may determine adjustments based upon sensor data and other information from a plurality of mobile computing devices 110 or security system hubs 114 associated with other users in other locations. For example, the server 140 may receive training and monitoring data from thousands of users, each using only a mobile computing device 110 to monitor a local physical environment 106 including a hotel room, which may be analyzed by the server 140 to determine adjustments to a profile for a user using only a mobile computing device 110 to monitor a hotel room based upon an existing profile associated with the user and the information associated with other users in similar environments. In some embodiments, the server 140 may determine adjustments to the profile using information stored in the database 146 even where the profile is stored locally on the mobile computing device 110 or security system hub 114. Such embodiment may be useful where large quantities of data stored in the database 146 are used to determine the adjustments.

At block 412, the mobile computing device 110 may determine whether the training period is complete or whether additional training is needed. If the training period is complete, the training method 400 may end. If the training period is ongoing, the mobile computing device 110 may continue to receive and record sensor data and adjust the profile at blocks 406-408, as discussed above.

Figure 5:
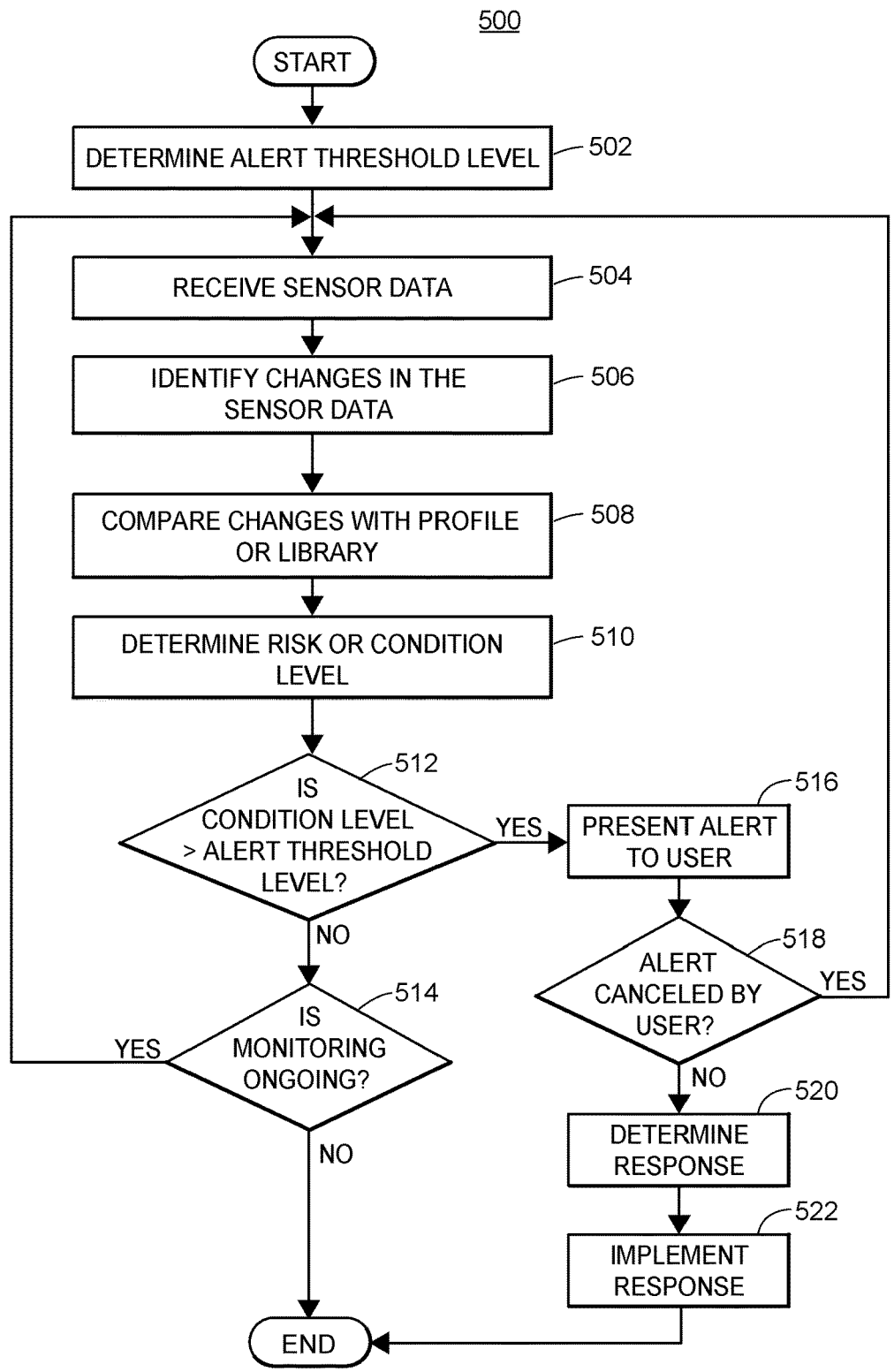
FIG. 5 illustrates a flow diagram of an exemplary abnormal environmental condition determination and response method in accordance with the embodiments described herein.

FIG. 5 illustrates a flow diagram of an exemplary abnormal environmental condition determination and response method 500 for monitoring environmental conditions within a local physical environment 106, determining whether an abnormal environmental condition has occurred, and determining a response when an abnormal environmental condition is found. It should be understood that exemplary method 500 is only a representative method consistent with numerous alternative methods for monitoring an environment and responding to abnormal environmental conditions. The method 500 may begin with a determination of one or more alert threshold levels at block 502, which may be based upon user preferences or profile information. Sensor data may be received and monitored at block 504, and changes in the sensor data may be identified at block 506. The changes in sensor data may be compared with patterns in a profile or library at block 508 to identify the closest matches. A risk or condition level may be determined at block 510 based upon the probable matches. If the condition level is above an alert threshold level at block 512, a response may be determined and implemented in blocks 516-522. In some embodiments, the response may include presenting an alert to the user at block 516, then determining a further response at block 520 and causing the further response to be implemented at block 522, unless the user cancels or stops the alert at block 518. If the condition level is at or below the alert threshold at block 512, the method 500 may continue to monitor the local physical environment 106 at blocks 504-510 until an indication or command to stop monitoring is found at block 514 to have been received. The method 500 may then terminate, and information obtained during implementation of the method may be recorded in some embodiments.

At block 502, the mobile computing device 110 may determine one or more alert threshold levels for use in monitoring the local physical environment 106. The alert threshold levels may correspond to different types of abnormal environmental conditions or threats (e.g., fire, intrusion, gas leak, flooding, etc.). The alert threshold levels may also correspond to different responses (e.g., alert to user, alarm, alert to monitoring service or emergency services, etc.). In some embodiments, the one or more alert threshold levels may correspond to risk levels, probabilities of received sensor data accurately indicating an abnormal environmental condition, or other measures corresponding to the likelihood of the occurrence of an abnormal environmental condition or the severity of such abnormal environmental condition. In some embodiments, the one or more alert threshold levels may be determined based at least in part upon information obtained during the training period discussed above over a time period of one or more days or parts of days, including sensor data received from internal sensors 108 or external sensors 120.

Alert threshold levels may be determined by reference to a profile, may be set by user-configurable settings or preferences, or may be determined automatically by the mobile computing device 110 in some embodiments. The mobile computing device 110 may determine one or more alert threshold levels based upon information including indications of available sensors, characteristics of the local physical environment 106, location of the mobile computing device 110 or external sensors 120 within the local physical environment 106, general risk levels for a geographical area based upon additional information from external sources received via the network 130, or other relevant information. Alert threshold levels may be fixed, predetermined by user-adjustable settings or preferences, or automatically adjusted based upon available information. In some embodiments, the mobile computing device 110 may adjust alert threshold levels based upon additional information from external sources. For example, the alert threshold may be lowered based upon additional information indicating a power outage because of the increased risks associated therewith. As another example, the alert threshold level may be raised during weekend daylight hours because of lower statistical risk levels and the general increase in activity (and, therefore, sounds, movement, etc.) at some locations.

At block 504, the mobile computing device 110 may receive sensor data from internal sensors 108 or external sensors 120, as discussed in further detail elsewhere herein. Also as discussed in further detail elsewhere herein, the mobile computing device 110 may receive additional information from external sources. In some embodiments, the mobile computing device 110 may instead provide sensor data or additional information to the security system hub 114 or the server 140, which may use the received sensor data or additional information to determine whether abnormal environmental conditions exist.

At block 506, the mobile computing device 110 (or the security system hub 114 or the server 140) may process the received sensor data to identify changes in the sensor data. The controller 210 of the mobile computing device 110 may process the received sensor data using one or more filters or other comparison techniques to identify relevant changes in the received data. In some embodiments, this may include filtering out cyclical or repeated changes, such as a cyclical hum of a light or fan or the grey noise of circulating air passing through a vent. Although changes in sensor data may be determined in some embodiments for efficient processing, alternative embodiments may not separately identify changes in sensor data. Such alternative embodiments may instead determine environmental risk or condition levels directly from the received sensor data or additional information, using random forests, neural networks, support vector machines, or any other type of computer learning techniques.

At block 508, the mobile computing device 110 may compare the identified changes in sensor data against the profile or library to determine usual or unusual changes. This may include determining likely causes of identified changes in sensor data or determining the probability of the changes matching a known pattern. Multiple possible pattern matches may be determined for each identified change or group of changes in the sensor data, and comparisons may build upon other comparisons in a hierarchical manner to produce actionable information. For example, a brief sound sensed at the microphone 256 may be determined by the controller 210 to match glass breaking with 87% probability, a plurality of glass objects dropping with 14%, and a plastic object cracking with 27%. If further sensor data indicates a change in temperature, air flow, or pressure, the mobile computing device 110 may build off of these comparisons to additionally determine a match to a pattern for a broken window of 96%. In some embodiments, this may include further identifying changes in the sensor data that may be recognized as normal or unproblematic occurrences, such as snoring or thunder. Such matches may also be compared with other sensor data or matches with patterns in the profile or library to determine further matches or to adjust probabilities of matches.

At block 510, the mobile computing device 110 may determine one or more risk or condition levels based upon the received sensor data. This may include determining probabilities of the existence of one or more abnormal environmental conditions, estimates of errors (type I or type II errors), one or more threat levels indicating potential threats associated with abnormal environmental conditions potentially detected by the sensors, or a total risk level associated with all potentially detected abnormal environmental conditions (which may be weighted based upon likelihood or potential harm). In some embodiments, the controller 210 may implement random forests, neural networks, support vector machines, or any other type of computer learning techniques to determine risk or condition levels from the sensor data or additional information. In further embodiments, the security system hub 114 or the server 140 may determine one or more of the risk or condition levels.

In determining risk or condition levels, the mobile computing device 110 may further implement one or more software routines to process the sensor data, the identified changes in sensor data, information regarding the comparisons of the sensor data with the profile or library, or additional information received from external sources. Data from multiple sources or over a period of time may be used to determine risk or condition levels. For example, the mobile computing device 110 may determine that additional information indicating a low probability of lightning in the area to determine a lower likelihood that sensor data indicates a peal of thunder, and thus increase the risk or condition level based upon discounting a low-risk possible match for the sensor data. As another example, additional information indicating a power outage may cause the mobile computing device 110 to increase the risk or condition levels associated with some or all possible abnormal environmental conditions. This may correspond to increases in risks of various threats, such as an increased risk of burglary because security systems are disabled, increased risk of water damage from the correlation between strong storms and power outages, or an increased risk of fire as a result of candles being used for light. As a further example, previously received sensor data such as sounds of a rattling doorknob may be non-linearly cumulative, such that subsequent sensor data indicating rattling or opening of another door or window may cause the mobile computing device 110 to determine a much higher risk or condition level associated with attempted unauthorized entry.

At block 512, the mobile computing device 110 may compare the one or more risk or condition levels with one or more alert threshold levels to determine whether an abnormal environmental condition has occurred. In some embodiments, this may include determining whether the one or more risk or condition levels exceed a plurality of alert threshold levels, with each alert threshold level corresponding to a different response. For example, a condition level may reach a value above an alert threshold for warning a user of an abnormal environmental condition but below a threshold for sounding an alarm or transmitting an alert to the monitoring service center 150. When no risk or condition level exceeds a minimum alert threshold level of the one or more alert threshold levels, the method 500 may continue at block 514 by determining whether monitoring of the local physical environment 106 is ongoing. If monitoring is ongoing, the mobile device 110 may continue to receive sensor data at block 504. If monitoring is no longer ongoing, the method 500 may end.

When a risk or condition level is determined at block 512 to be above an alert threshold level, the mobile computing device 110 may, in some embodiments, cause an alert to be presented to the user of the mobile computing device 110 at block 516. The alert may be presented using the display 202, the speaker 204, a haptic alert unit (not shown), a communicatively connected peripheral device (e.g., a Bluetooth headset, a wearable computing device, a fitness tracker, etc.), a personal computer (not shown), or another mobile computing device 110 associated with the user. The alert may include information regarding the abnormal environmental condition, the sensor data, the additional information from external sources, or other relevant information. In some embodiments, no user alert may be generated, in which case the block 516 may be absent, although the user may still be able to cancel or terminate an alert or alarm using the mobile computing device 110 or a control panel of the security system hub 114.

In some embodiments, the alert may include one or more options to allow the user to influence a further response to the abnormal environmental condition. In further embodiments, the presentation of such options to the user may depend upon the risk or condition level, with risk or condition levels above an emergency threshold level (above the alert threshold level) resulting in immediate response without first presenting options to the user. When presented to the user, such options may include options to confirm the occurrence of the abnormal environmental condition, disaffirm the occurrence of the abnormal environmental condition, contact an emergency response center, initiate an alarm, or cancel an alarm. For example, the alert to the user may present information relating to the abnormal environmental condition and may further cause an alarm to sound (immediately or after a delay). The user may review the presented information and choose to cancel the alarm in some circumstances. When the user cancels or otherwise terminates the alert at block 518, the method 500 may continue monitoring the local physical environment 106 by receiving sensor data at block 504. In such circumstances, the user's selection to cancel the alert may be recorded or used to adjust a profile. In other circumstances, the user may instead choose to begin an alarm immediately, extend the alarm, or contact either the monitoring service center 150 or the emergency services system 160 to obtain emergency assistance. Such emergency assistance requests may include communication of automatically generated messages between the mobile computing device 110 and the monitoring service center 150 or the emergency services system 160 via the network 130, or the mobile computing device 110 may connect the user to an automated system or operator at the monitoring service center 150 or the emergency services system 160. When the user does not cancel the alert at block 518, the method 500 may continue to determine and implement a further response to the abnormal environmental condition at block 520-522.

At block 520, the mobile computing device 110 may determine a response to the abnormal environmental condition based upon the received sensor data, the profile, the environment, or the selection of an option by the user. The response may include sounding an alarm, causing warning lights to activate, illuminating the local physical environment (such as by causing communicatively connected computer-controlled lights to illuminate), communicating an alert message to the server 140, to the monitoring service center 150, or to the emergency services system 160 via the network 130, recording or transmitting sensor data (e.g., photographs or video of the local physical environment 106) to the server 140 via the network 130, or other similar responses. The response may be determined based upon the type of abnormal environmental condition detected. For example, a detected intrusion or fire may result in a response including an alarm and an alert sent to a monitoring service center 150, while a detected leak may result in illuminating the environment and alerting the monitoring service center 150 after additional attempts to alert the user of the mobile computing device 110. The determined response may further depend upon a risk or condition level indicating a severity of a threat. For example, the mobile computing device 110 may bypass alerting the monitoring service center 150 and instead alert the emergency services system 160 if gunshots are detected. In further embodiments, the determined response may be limited based upon unavailability of necessary access to implement some responses. For example, an alert may not be transmitted to the server 140 if the mobile computing device 110 cannot access the network 130 via the router 112. The response may further be determined in part based upon the type or geographical location of the local physical environment 106. For example, an alert may not be sent to the monitoring service center 150 if the mobile computing device 110 is located outside of the geographic coverage area of the monitoring service center 150 (e.g., when the local physical environment 106 is a hotel room in a distant city, etc.).

At block 522, the mobile computing device 110 may cause the determined response to be implemented. This may include flashing the display 202 or generating an alarm tone using the speaker 204 of the mobile computing device. This may further include directly or indirectly controlling alarm components, such as the one or more alarms 122. The mobile computing device 110 or the security system hub 114 may further cause responses to be implemented by communicating with the server 140, the monitoring service center 150, or the emergency services system 160 via the network 130. In some embodiments, the implementation of some responses may be limited or restricted based upon the profile or user settings. For example, the user may select a setting requiring user confirmation before transmitting an alert to the monitoring service center 150 or the emergency services system 160 via the network 130. After causing the implementation of the determined response, the method 500 may continue monitoring the local physical environment 106 by receiving sensor data at block 504, or the method 500 may terminate. In some embodiments, sensor data or other information regarding an abnormal environmental condition may be recorded on the mobile computing device 110 or transmitted to the server 140 via the network 130 for storage.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention. By way of example, and not limitation, the present disclosure contemplates at least the following aspects:

1. A computer system for monitoring a local physical environment, comprising: a mobile computing device having one or more processors and one or more environmental sensors configured to provide information regarding the local physical environment in which the mobile computing device is located; a program memory storing executable instructions that, when executed by the one or more processors, cause the computer system to: receive sensor data regarding the local physical environment from the one or more environmental sensors; determine the occurrence of an abnormal environmental condition based upon the received sensor data; determine a response to the abnormal environmental condition, wherein the response includes one or more alerts; and cause the determined response to be implemented.

2. The computer system according to aspect 1, wherein the mobile computing device is one of the following: a smartphone or a tablet computer.

3. The computer system according to either aspect 1 or aspect 2, further comprising one or more additional sensors communicatively connected to the mobile computing device, wherein the received sensor data further includes data from the one or more additional sensors.

4. A computer-implemented method for monitoring a local physical environment, comprising: receiving, at one or more processors, sensor data regarding the local physical environment from one or more environmental sensors disposed within a mobile computing device and configured to provide information regarding the local physical environment in which the mobile computing device is located; determining, by one or more processors, the occurrence of an abnormal environmental condition based upon the received sensor data; determining, by one or more processors, a response to the abnormal environmental condition, wherein the response includes one or more alerts; and causing, by one or more processors, the determined response to be implemented.

5. The computer-implemented method according to aspect 4, wherein the mobile computing device includes one or more of the following: a smartphone or a tablet computer.

6. The computer-implemented method according to either aspect 4 or aspect 5, wherein: the one or more alerts include an emergency alert indicating an emergency situation; and causing the determined response to be implemented includes communicating the emergency alert to one or more of the following emergency services: an alarm monitoring service, an emergency response system, an emergency response dispatch center, a public safety answering point, a police department, a fire department, an ambulance service, or a hospital.

7. The computer-implemented method according to any one of aspects 4-6, wherein the one or more alerts include a notification alert to a user, wherein the notification alert includes an option to allow the user to do one or more of the following: confirm the occurrence of the abnormal environmental condition, disaffirm the occurrence of the abnormal environmental condition, contact an emergency response center, initiate an alarm, or cancel an alarm.

8. The computer-implemented method according to any one of aspects 4-7, wherein determining the occurrence of the abnormal environmental condition further includes: determining, by one or more processors, a threshold level based upon the one or more environmental sensors; determining, by one or more processors, a condition level based upon the received sensor data; and determining, by one or more processors, that the determined condition level has exceeded the threshold level.

9. The computer-implemented method according to any one of aspects 4-8, wherein the threshold level is further determined based upon training sensor data previously received from the one or more environmental sensors during a training period extending over a past period of at least parts of multiple days.

10. The computer-implemented method according to any one of aspects 4-8, wherein the threshold level is adjusted based upon information regarding the local physical environment received by the mobile computing device.

11. The computer-implemented method according to any one of aspects 4-10, wherein: the mobile computing device is communicatively connected to a security system installed within a building; and the security system implements at least a portion of the determined response including at least one of the one or more alerts.

12. The computer-implemented method according to any one of aspects 4-11, wherein the one or more environmental sensors include one or more of the following: a microphone, a camera, an accelerometer, a gyroscope, a barometer, or a geolocation unit.

13. The computer-implemented method according to any of aspects 4-12, wherein the abnormal environmental condition includes one or more of the following: a burglary, an unlawful entry, a home invasion, an intrusion, a fire, a flood, a leak, or a structural failure.

14. A tangible, non-transitory computer-readable medium storing instructions for monitoring a local physical environment that, when executed by one or more processors of a computer system, cause the computer system to: receive sensor data regarding the local physical environment from one or more environmental sensors disposed within a mobile computing device and configured to provide information regarding the local physical environment in which the mobile computing device is located; determine the occurrence of an abnormal environmental condition based upon the received sensor data; determine a response to the abnormal environmental condition, wherein the response includes one or more alerts; and cause the determined response to be implemented.

15. The tangible, non-transitory computer-readable medium according to aspect 14, wherein the mobile computing device includes one or more of the following: a smartphone or a tablet computer.

16. The tangible, non-transitory computer-readable medium according to either aspect 14 or aspect 15, wherein: the one or more alerts include an emergency alert indicating an emergency situation; and the instructions that cause the determined response to be implemented further cause the computer system to communicate the emergency alert to one or more of the following emergency services: an alarm monitoring service, an emergency response system, an emergency response dispatch center, a public safety answering point, a police department, a fire department, an ambulance service, or a hospital.

17. The tangible, non-transitory computer-readable medium according to any one of aspects 14-16, wherein the one or more alerts include a notification alert to a user, wherein the notification alert includes an option to allow the user to do one or more of the following: confirm the occurrence of the abnormal environmental condition, disaffirm the occurrence of the abnormal environmental condition, contact an emergency response center, initiate an alarm, or cancel an alarm.

18. The tangible, non-transitory computer-readable medium according to any one of aspects 14-17, wherein the instructions that cause the computer system to determine the occurrence of the abnormal environmental condition include instructions that cause the computer system to: determine a threshold level based upon the one or more environmental sensors; determine a condition level based upon the received sensor data; and determine that the determined condition level has exceeded the threshold level.

19. The tangible, non-transitory computer-readable medium according to any one of aspects 14-18, wherein the threshold level is further determined based upon training sensor data previously received from the one or more environmental sensors during a training period extending over a past period of at least parts of multiple days.

20. The tangible, non-transitory computer-readable medium according to any one of aspects 14-19, wherein: the mobile computing device is communicatively connected to a security system installed within a building; and the security system implements at least a portion of the determined response including at least one of the one or more alerts.

What is claimed is:

1. A mobile computing device for monitoring a local physical environment of the mobile computing device as a stand-alone personal security system, comprising:
   one or more processors;
   one or more output components;
   one or more environmental sensors disposed within the mobile computing device and configured to provide information regarding the local physical environment in which the mobile computing device is located; and
   a program memory storing executable instructions that, when executed by the one or more processors of the mobile computing device, cause the mobile computing device to operate as the stand-alone personal security system, without communicating with another security system within the local physical environment, by:
      generating sensor data regarding the local physical environment using the one or more environmental sensors;
      determining a probability with which a portion of the sensor data matches a high-risk abnormal condition pattern in a generic library of sensor data patterns associated with a plurality of levels of risks of abnormal environmental conditions, wherein the high-risk abnormal condition pattern comprises a pattern of sensor data from at least one of the one or more environmental sensors that is indicative of a high risk of an abnormal condition in a plurality of environments;
      identifying an occurrence of an abnormal environmental condition based upon the determined probability exceeding a threshold level based upon the sensor data matching the high-risk abnormal condition pattern; and
      in response to identifying the occurrence of the abnormal environmental condition, presenting an alert associated with the abnormal environmental condition via the one or more output components.

2. The mobile computing device of claim 1, wherein the executable instructions that cause the mobile computing device to present the alert cause the mobile computing device to sound an alarm via a speaker of the mobile computing device.

3. The mobile computing device of claim 1, wherein the executable instructions further cause the mobile computing device to:
   determine a location of the mobile computing device based upon location data from a Global Positioning System (GPS) unit; and
   select the generic library of sensor data patterns based upon the location of the mobile computing device.

4. The mobile computing device of claim 1, wherein the sensor data patterns in the generic library include a plurality of combination patterns, each combination pattern combining a plurality of types of sensor data from a plurality of types of environmental sensors.

5. A computer-implemented method for monitoring a local physical environment using a mobile computing device within the local physical environment as a stand-alone personal security system, comprising:
   generating, by one or more environmental sensors of the mobile computing device, sensor data regarding the local physical environment;
   determining, by one or more processors of the mobile computing device, a probability with which a portion of the sensor data matches a high-risk abnormal condition pattern in a generic library of sensor data patterns associated with a plurality of levels of risks of abnormal environmental conditions, wherein the high-risk abnormal condition pattern comprises a pattern of sensor data from at least one of the one or more environmental sensors that is indicative of a high risk of an abnormal condition in a plurality of environments;

identifying, by one or more processors of the mobile computing device, an occurrence of an abnormal environmental condition based upon the determined probability exceeding a threshold level based upon the sensor data matching the high-risk abnormal condition pattern; and in response to identifying the occurrence of the abnormal environmental condition, presenting, via one or more output components of the mobile computing device, an alert associated with the abnormal environmental condition, wherein the mobile computing device is configured to operate as the stand-alone personal security system without communicating with another security system within the local physical environment.

6. The computer-implemented method of claim 5, wherein:

the one or more output components include a speaker of the mobile computing device; and presenting the alert includes sounding an alarm via the speaker of the mobile computing device.

7. The computer-implemented method of claim 5, wherein:

the alert includes a notification to a user of the mobile computing device;

the notification includes at least one option to: confirm the occurrence of the abnormal environmental condition, disaffirm the occurrence of the abnormal environmental condition, contact an emergency response center, initiate an alarm, or cancel an alarm.

8. The computer-implemented method of claim 5, further comprising:

determining, by a Global Positioning System (GPS) unit of the mobile computing device, a location of the mobile computing device; and selecting, by one or more processors of the mobile computing device, the generic library of sensor data patterns based upon the location of the mobile computing device.

9. The computer-implemented method of claim 5, wherein the sensor data patterns in the generic library include a plurality of sound patterns associated with abnormal environmental conditions.

10. The computer-implemented method of claim 5, wherein the sensor data patterns in the generic library include a plurality of combination patterns, each combination pattern combining a plurality of types of sensor data from a plurality of types of environmental sensors.

11. The computer-implemented method of claim 5, wherein the one or more environmental sensors include one or more of the following: a microphone, a camera, an accelerometer, a gyroscope, or a barometer.

12. The computer-implemented method of claim 5, wherein the abnormal environmental condition includes one or more of the following: a burglary, an unlawful entry, a home invasion, an intrusion, a fire, a flood, a leak, or a structural failure.

13. A tangible, non-transitory computer-readable medium storing executable instructions for monitoring a local physical environment that, when executed by one or more processors of a mobile computing device, cause the mobile computing device to operate as a stand-alone personal security system, without communicating with another security system within the local physical environment, by:

generating sensor data regarding the local physical environment using one or more environmental sensors of the mobile computing device;

determining a probability with which a portion of the sensor data matches a high-risk abnormal condition pattern in a generic library of sensor data patterns associated with a plurality of levels of risks of abnormal environmental conditions, wherein the high-risk abnormal condition pattern comprises a pattern of sensor data from at least one of the one or more environmental sensors that is indicative of a high risk of an abnormal condition in a plurality of environments;

identifying an occurrence of an abnormal environmental condition based upon the determined probability exceeding a threshold level based upon the sensor data matching the high-risk abnormal condition pattern; and in response to identifying the occurrence of the abnormal environmental condition, presenting an alert associated with the abnormal environmental condition via one or more output components of the mobile computing device.

14. The tangible, non-transitory computer-readable medium of claim 13, wherein the executable instructions that cause the mobile computing device to present the alert cause the mobile computing device to sound an alarm via a speaker of the mobile computing device.

15. The tangible, non-transitory computer-readable medium of claim 13, wherein the executable instructions that cause the mobile computing device to present the alert cause the mobile computing device to:

present a notification to a user via a display of the mobile computing device; and receive a user selection of at least one option to: confirm the occurrence of the abnormal environmental condition, disaffirm the occurrence of the abnormal environmental condition, contact an emergency response center, initiate an alarm, or cancel an alarm.

16. The tangible, non-transitory computer-readable medium of claim 13, wherein the executable instructions further cause the mobile computing device to:

determine a location of the mobile computing device based upon location data from a Global Positioning System (GPS) unit; and select the generic library of sensor data patterns based upon the location of the mobile computing device.

17. The tangible, non-transitory computer-readable medium of claim 13, wherein the sensor data patterns in the generic library include a plurality of sound patterns associated with abnormal environmental conditions.

18. The tangible, non-transitory computer-readable medium of claim 13, wherein the sensor data patterns in the generic library include a plurality of combination patterns, each combination pattern combining a plurality of types of sensor data from a plurality of types of environmental sensors.

19. The tangible, non-transitory computer-readable medium of claim 13, wherein the one or more environmental sensors include one or more of the following: a microphone, a camera, an accelerometer, a gyroscope, or a barometer.

20. The tangible, non-transitory computer-readable medium of claim 13, wherein the abnormal environmental condition includes one or more of the following: a burglary, an unlawful entry, a home invasion, an intrusion, a fire, a flood, a leak, or a structural failure.

* * * * *